US010440413B2

(12) United States Patent
Nelson et al.

(10) Patent No.: US 10,440,413 B2
(45) Date of Patent: Oct. 8, 2019

(54) METHODS AND APPARATUS TO PERFORM MEDIA DEVICE ASSET QUALIFICATION

(71) Applicant: The Nielsen Company (US), LLC, New York, NY (US)

(72) Inventors: Daniel Nelson, Tampa, FL (US); James Petro, Dunedin, FL (US); Albert T. Borawski, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/665,055

(22) Filed: Jul. 31, 2017

(65) Prior Publication Data

US 2019/0037257 A1    Jan. 31, 2019

(51) Int. Cl.
*H04N 21/24* (2011.01)
*H04N 21/254* (2011.01)
(Continued)

(52) U.S. Cl.
CPC ..... *H04N 21/2407* (2013.01); *G06F 16/2255* (2019.01); *H04N 21/254* (2013.01); *H04N 21/25891* (2013.01); *H04N 21/4394* (2013.01); *H04N 21/44008* (2013.01); *H04N 21/44222* (2013.01); *H04N 21/6543* (2013.01); *H04N 21/812* (2013.01); *H04N 21/4113* (2013.01); *H04N 21/4126* (2013.01)

(58) Field of Classification Search
CPC ............. H04N 21/2407; H04N 21/254; H04N 21/25891; H04N 21/4394; H04N 21/44008; H04N 21/6543; H04N 21/3033; H04N 21/4113; H04N 21/4126
See application file for complete search history.

(56) References Cited

U.S. PATENT DOCUMENTS 6,785,714 B1    8/2004  Thompson et al.
7,650,616 B2    1/2010  Lee
(Continued)

OTHER PUBLICATIONS

International Searching Authority, "International Search Report," issued in connection with International application No. PCT/US2018/044203, dated Nov. 13, 2018, 3 pages.
(Continued)

*Primary Examiner* — Yassin Alata
(74) *Attorney, Agent, or Firm* — Hanley, Flight & Zimmerman, LLC

(57) ABSTRACT

Methods, apparatus, systems and articles of manufacture to perform media device asset qualification are disclosed. An example apparatus includes an asset quality evaluator to identify candidate media device assets obtained from a media device that identify media. The example apparatus further includes an asset grader to grade the candidate media device assets based on calculating a valid hash count corresponding to a number of matches between a first one of the candidate media device assets compared to a second one of the candidate media device assets using a hash table, and identify the first one of the candidate media device assets as a reference media device asset, the first one having a higher grade compared to grades of other candidate media device assets. The example apparatus further includes an asset loader to generate a validation report including the identification of the reference media device asset.

20 Claims, 9 Drawing Sheets

(51) Int. Cl.
*H04N 21/258* (2011.01)
*H04N 21/439* (2011.01)
*H04N 21/44* (2011.01)
*H04N 21/6543* (2011.01)
*G06F 16/22* (2019.01)
*H04N 21/442* (2011.01)
*H04N 21/81* (2011.01)
*H04N 21/41* (2011.01)

(56) References Cited

U.S. PATENT DOCUMENTS

| | | | | |
|---|---|---|---|---|
| 8,611,422 | B1* | 12/2013 | Yagnik | G06F 17/30784 375/240.01 |
| 8,934,545 | B2 | 1/2015 | Bilobrov | |
| 9,438,940 | B2 | 9/2016 | Nelson | |
| 2009/0288131 | A1* | 11/2009 | Kandekar | G06F 17/30029 725/133 |
| 2015/0113575 | A1 | 4/2015 | Li et al. | |
| 2015/0289013 | A1 | 10/2015 | Nelson et al. | |
| 2015/0363420 | A1 | 12/2015 | Garland et al. | |
| 2016/0105428 | A1 | 4/2016 | Schrempp et al. | |
| 2017/0103385 | A1 | 4/2017 | Wilson, Jr. et al. | |
| 2017/0109596 | A1 | 4/2017 | Liu et al. | |

OTHER PUBLICATIONS

International Searching Authority, "Written Opinion of the International Searching Authority," issued in connection with International application No. PCT/US2018/044203, dated Nov. 13, 2018, 4 pages.

Discovery Reply, "Digital Asset Management," [online] Jul. 9, 2017, retrieved from https://www.reply.com/Documents/8007_img_DigitalMedia-DigitalAssetManagement_eng.pdf, 22 pages. See sections 2-3.

* cited by examiner

METHODS AND APPARATUS TO PERFORM MEDIA DEVICE ASSET QUALIFICATION

FIELD OF THE DISCLOSURE

This disclosure relates generally to monitoring media and, more particularly, to methods and apparatus to perform media device asset qualification.

BACKGROUND

In recent years, methods of accessing media have evolved. For example, in the past, media was primarily accessed via televisions coupled to set-top boxes. Recently, media services deployed via Over-The-Top (OTT) devices or internet streaming capable devices, such as an Amazon Kindle Fire™, an Apple TV®, a Roku® media player, etc., have been introduced that allow users to request and present the media on the OTT devices. Such OTT devices, as well as other media presentation platforms, such as desktop, laptop, and handheld mobile devices (e.g., smartphones, tablets, etc.) enable consumption of the media from a variety of content providers and content publishers.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
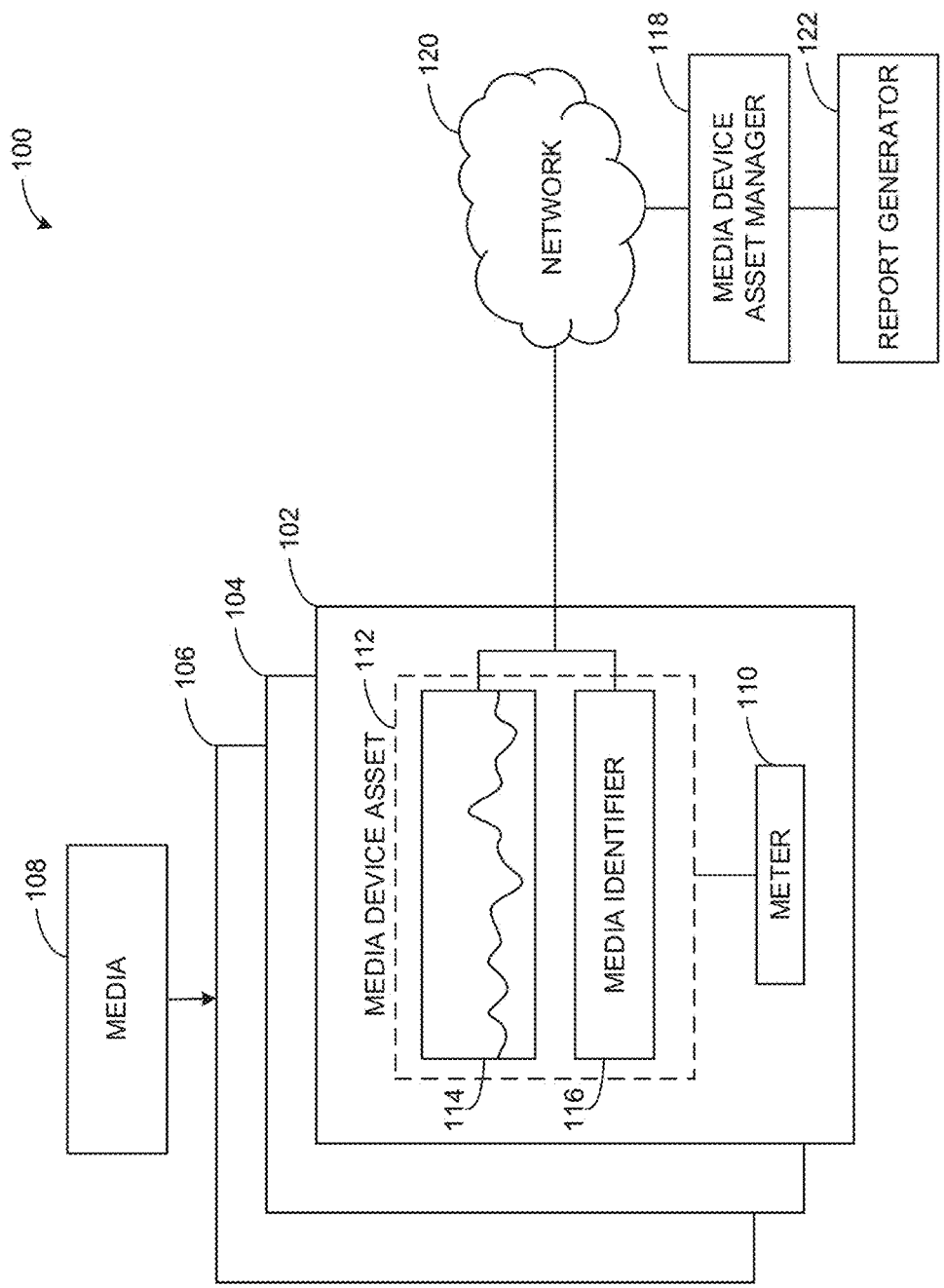
FIG. 1 is a block diagram of an example environment in which an example media device asset manager monitors media from media devices.

Many entities have an interest in understanding how users are exposed to media on the Internet. For example, an audience measurement entity (AME) desires knowledge on how users interact with media devices such as smartphones, tablets, laptops, smart televisions, etc. In particular, an example AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc. of an audience for media. For example, media (e.g., audio and/or video media) may be distributed by a media distributor to media consumers. Content distributors, advertisers, content producers, etc. have an interest in knowing the size of an audience for media from the media distributor, the extent to which an audience consumes the media, whether the audience pauses, rewinds, fast forwards the media, etc. As used herein the term "content" includes programs, advertisements, clips, shows, etc. As used herein, the term "media" includes any type of content and/or advertisement delivered via any type of distribution medium. As used herein "media" refers to audio and/or visual (still or moving) content and/or advertisements. Thus, media includes television programming or advertisements, radio programming or advertisements, movies, web sites, streaming media, etc.

In some instances, AMEs identify media by extracting media identifiers such as signatures or media-identifying metadata such as codes, watermarks, etc., and comparing them to reference media identifiers. For example, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

In some instances, an unrepeatable signature or an unmatchable signature for the media may be generated due to background noise or media presentation environmental noise. For example, while generating a reference signature, an audible noise emanating from the media device (e.g., a noise from a message alert on a smartphone, a noise from an email alert on a tablet, etc.) while the media device is presenting the media can cause undesired audio characteristics to be included in the reference signature. In such an example, when comparing a signature corresponding to the media to the reference signature corresponding to the same media, a match may not be made due to the audible noise characteristics included in the reference signature.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Example methods, apparatus, and articles of manufacture disclosed herein monitor media presentations at media devices. Such media devices may include, for example, Internet-enabled televisions, personal computers (e.g., desktop computers, laptop computers, etc.), Internet-enabled mobile handsets (e.g., a smartphone), video game consoles (e.g., Xbox®, PlayStation®), tablet computers (e.g., an iPad®), digital media players (e.g., an Apple TV®, an Amazon Kindle Fire™, a Roku® media player, a Slingbox®, etc.), etc.

In examples disclosed herein, a media device asset manager (MDAM) obtains a media device asset including one or more signatures from a media device and one or more corresponding media identifiers. As used herein, the term "media device asset" refers to any type of extracted information from media presented at a media device that includes one or more signatures or media-identifying metadata such as one or more codes, one or more watermarks, etc. As used herein, the term "media identifier" refers to any type of media identification information that includes a source identifier, a stream identifier, a passive audio signature (PAS) timestamp, a duration of media, etc., and/or a combination thereof.

In some disclosed examples, the MDAM obtains a media asset including one or more signatures and one or more corresponding media identifiers not from a media device. As used herein, the term "media asset" refers to any type of extracted information from media that includes one or more signatures or media-identifying metadata such as one or more codes, one or more watermarks, etc.

In some disclosed examples, a media device asset is a collection of two or more signatures from a media device that individually and/or collectively identifies media from which the signatures were obtained. For example, the media device asset may be a sequence of two or more signatures obtained from a meter operating on an Over-The-Top (OTT) device monitoring a presentation of the Home Box Office (HBO) content "Game of Thrones" on the OTT device. In another example, the meter may be operating externally to the OTT device. In such an example, the media device asset may be a sequence of two or more signatures obtained from a media meter, a people meter, etc., monitoring a presentation of the media.

In some disclosed examples, media is presented at a media device and a meter monitoring the media device uses signature-generation software to generate media device assets based on the presented media. In such disclosed examples, the media device asset may include unidentifiable data or unmatchable data (e.g., unidentifiable signatures, etc.) due to environmental elements such as audible noise emanating from the media device (e.g., a noise from a message alert on a smartphone, a noise from an email alert on a tablet, etc.). In some disclosed examples, a qualification process can be applied to the unidentifiable signatures to determine whether they can be stored in a reference signature database. In some disclosed examples, the meter operates on the media device (e.g., a signature-generation application executing computer readable instructions on a laptop, etc.). In other disclosed examples, the meter operates externally to the media device (e.g., a standalone metering device, etc.).

In some disclosed examples, the MDAM determines whether an obtained media device asset is a duplicate syndicated media device asset, a duplicate proprietary media asset, or a syndicated duplicate of a proprietary media asset. As used herein, the term "syndicated media device asset" refers to a media device asset obtained from a media device that can be subsequently used for measurement and/or reporting for any AME client. As used herein, the term "proprietary media asset" refers to a media device asset obtained from a client of the AME and may only be subsequently used for measurement and/or reporting for the client.

In some disclosed examples, the MDAM determines that a media device asset obtained from a media device has already been stored in a database (e.g., a media device asset database, etc.). For example, the MDAM may identify the media device asset as a duplicate syndicated media device asset. In such an example, the MDAM may (1) identify the media device asset based on an extracted media identifier, (2) determine that the media device asset has previously been stored in the database, and (3) determine that the previously stored media device asset is not a proprietary media asset. In such an example, the MDAM may store a log corresponding to determining that the media device asset is a duplicate syndicated media device asset. Additionally or alternatively, the example MDAM may increment a duplicate syndicated media device asset counter corresponding to a number of times the media device asset is obtained and/or determined to be a duplicate syndicated media device asset. In response to storing the log and/or incrementing the duplicate syndicated media device asset counter, the MDAM may discard the media device asset.

In some disclosed examples, the MDAM determines that an obtained media asset is a duplicate proprietary media asset. In such an example, the MDAM may store a log corresponding to determining that the obtained media device asset is a duplicate proprietary media asset. Additionally or alternatively, the example MDAM may increment a duplicate proprietary media asset counter corresponding to a number of times the media device asset is obtained and/or determined to be a duplicate proprietary media asset. In response to storing the log and/or incrementing the duplicate proprietary media asset counter, the MDAM may discard the obtained media asset.

In some disclosed examples, the MDAM identifies a media device asset obtained from a media device as a syndicated duplicate of a proprietary media asset. In such an example, the MDAM may (1) identify the media device asset based on an extracted media identifier, (2) determine that the media device asset has previously been stored in the database, and (3) determine that the previously stored media device asset is a proprietary media asset. In such an example, the MDAM may store a log corresponding to determining that the media device asset is a syndicated duplicate of a proprietary media asset. Additionally or alternatively, the example MDAM may replace the previously stored proprietary media asset with the media device asset.

In some disclosed examples, the MDAM determines that a media device asset obtained from a media device has not been previously stored in a database (e.g., a media device asset database, etc.). In such disclosed examples, the MDAM identifies the media device asset as a database candidate. For example, a database candidate may correspond to media where there are no reference signatures stored in the database. As a result, a qualification process can be applied to one or more database candidates to determine a best one of the one or more database candidates to be stored in the database as a reference signature, a reference media device asset, etc.

As used herein, the term "database candidate" refers to a media device asset (e.g., a candidate media device asset, etc.) that can be selected to be stored in a database (e.g., a media device asset database, etc.) for AME measurement and/or reporting. For example, the MDAM may (1) obtain a media device asset, (2) identify media corresponding to the media device asset based on an extracted media identifier, (3) determine that the media device asset has not been previously stored in a media device asset database, (4) identify the media device asset as a database candidate, and (5) generate a database candidate counter. In such an example, the MDAM may (1) increment the database candidate counter each time a media device asset corresponding to the media is obtained, and (2) store the database candidate in a temporary database.

In some disclosed examples, the MDAM compares the database candidate counter to a threshold (e.g., a counter value of 10, 100, 1000, etc.) and determines whether the database candidate counter satisfies the threshold (e.g., a value of the database candidate counter is greater than 10, 100, 1000, etc.). In response to determining that the database candidate counter satisfies the threshold, the example MDAM may perform a qualification process on the one or more database candidates to identify which one of the database candidates is the best candidate to be stored in the media device asset database as a reference signature, a reference media device asset, etc., to be used by the AME for measurement and/or reporting, etc.

In some disclosed examples, the MDAM identifies a database candidate to be stored in a media device asset database by processing each media device asset based on continuity, commonality, and completeness. For example, the MDAM may process a media device asset for continuity anomalies that indicate trick mode, jumps in PAS timestamps, etc. In such an example, the MDAM may determine that a media device asset indicates trick mode based on the media-identifying metadata in the media identifier. In another example, the MDAM may determine that a user performed a viewing operation such as pausing, rewinding, fast forwarding, etc., based on a jump in PAS timestamps between signatures, the extracted media identifier, etc. In some disclosed examples, the MDAM discards a media device asset that is identified as a disqualified media asset, includes continuity anomalies, etc.

In another example, the MDAM may process the database candidates based on commonality by generating a hash table. For example, the MDAM may apply a hashing algorithm to the database candidates to generate a hash table. In such an example, the MDAM may compare (e.g., iteratively compare, etc.) each database candidate to another database candidate using the hash table. In some disclosed examples, the MDAM grades the results from the comparison process based on criterion such as valid hash counts, duration, gaps, etc. In such disclosed examples, the MDAM identifies the database candidate as a reference media device asset based on the grading process (e.g., the database candidate with the highest grade is selected, etc.). In such disclosed examples, the MDAM processes the reference media device asset by trimming, cropping, etc., non-matching portions of the reference media device asset. In such disclosed examples, the MDAM stores the reference media device asset into a database (e.g., the media device asset database, etc.). In another example, the MDAM may process the database candidates for completeness by determining if one or more PAS timestamps are missing from a media device asset, if the media device asset satisfies a minimum duration threshold, etc.

FIG. 1 is a block diagram of an example environment 100 constructed in accordance with the teachings of this disclosure to identify media presented at a media device. The example environment 100 includes example first, second, and third media devices 102, 104, 106. In the illustrated example of FIG. 1, the media devices 102, 104, 106 are devices that obtain media 108 and present the media 108. In the illustrated example, the media 108 is a video that includes audio. Alternatively, any other type of media may be used. In some examples, the media devices 102, 104, 106 are capable of directly presenting media (e.g., via a display) while, in some other examples, the media devices present the media on separate media presentation equipment (e.g., speakers, a display, etc.). For example, the media device 102 of the illustrated example is an Internet-enabled television capable of presenting media (e.g., via an integrated display and speakers, etc.) streaming from an OTT device. Alternatively, the media device 102 may be any other type of media device. Further, while in the illustrated example three media devices are shown, any number of media devices may be used.

In the illustrated example of FIG. 1, each of the media devices 102, 104, 106 include a meter 110. In the illustrated example, the meter 110 is a software application operating on the media devices 102, 104, 106 executing computer readable instructions to generate media device assets. Additionally or alternatively, the meter 110 may operate externally to the media devices 102, 104, 106 (e.g., a standalone device including a processor executing computer readable instructions, etc.). In the illustrated example, the meter 110 generates a media device asset 112 based on the media 108. In the illustrated example, the media device asset 112 includes a signature 114 and a media identifier 116. In the illustrated example, the signature 114 includes one or more audio-based signatures. Alternatively, the signature 114 may include one or more video-based signatures and/or any other type of signature based on media identification information (e.g., media-identifying metadata, etc.). In the illustrated example, the media identifier 116 includes media-identifying metadata corresponding to the media 108. For example, the meter 110 may determine that the signature 114 corresponds to the presentation of Season 7 Episode 1 of "Game of Thrones" based on analyzing the media-identifying metadata stored in the media identifier 116, where the media-identifying metadata was extracted from the audio of the media 108.

In the illustrated example of FIG. 1, the meter 110 transmits the media device asset 112 to a media device asset manager (MDAM) 118 via a network 120. In the illustrated example of FIG. 1, the network 120 is the Internet. However, the example network 120 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 120 enables the media devices 102, 104, 106, the meter 110, etc., to be in communication with the MDAM 118. As used herein, the phrase "in communication," including variances (e.g., secure or non-secure communications, compressed or non-compressed communications, etc.) therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the MDAM 118 coordinates an identification, a selection, etc., of a media device asset to be stored in a database for measuring and/or reporting by an AME. For example, the MDAM 118 may identify the media device asset 112 as a database candidate. In such an example, the MDAM 118 may apply a hashing algorithm to one or more media device assets including the media device asset 112 to generate a hash table, compare the media device asset 112 to one or more other media device assets based on the hash table, and determine whether to store the media device asset 112 in the database based on the comparison.

In the illustrated example of FIG. 1, a report generator 122 generates and/or prepares reports using information stored in the media device asset database. In the illustrated example, the report generator 122 prepares media measurement reports indicative of the exposure of the media 108 on the media devices 102, 104, 106. In some examples, the report generator 122 generates a report identifying demographics associated with the media 108 based on identifying one or more media device assets including the media device asset 112. For example, a panelist at a media exposure measurement location may have provided the panelist's demographics to the AME. The report generator 122 may prepare a report associating the obtained panelist demographics with the media 108.

Figure 2:
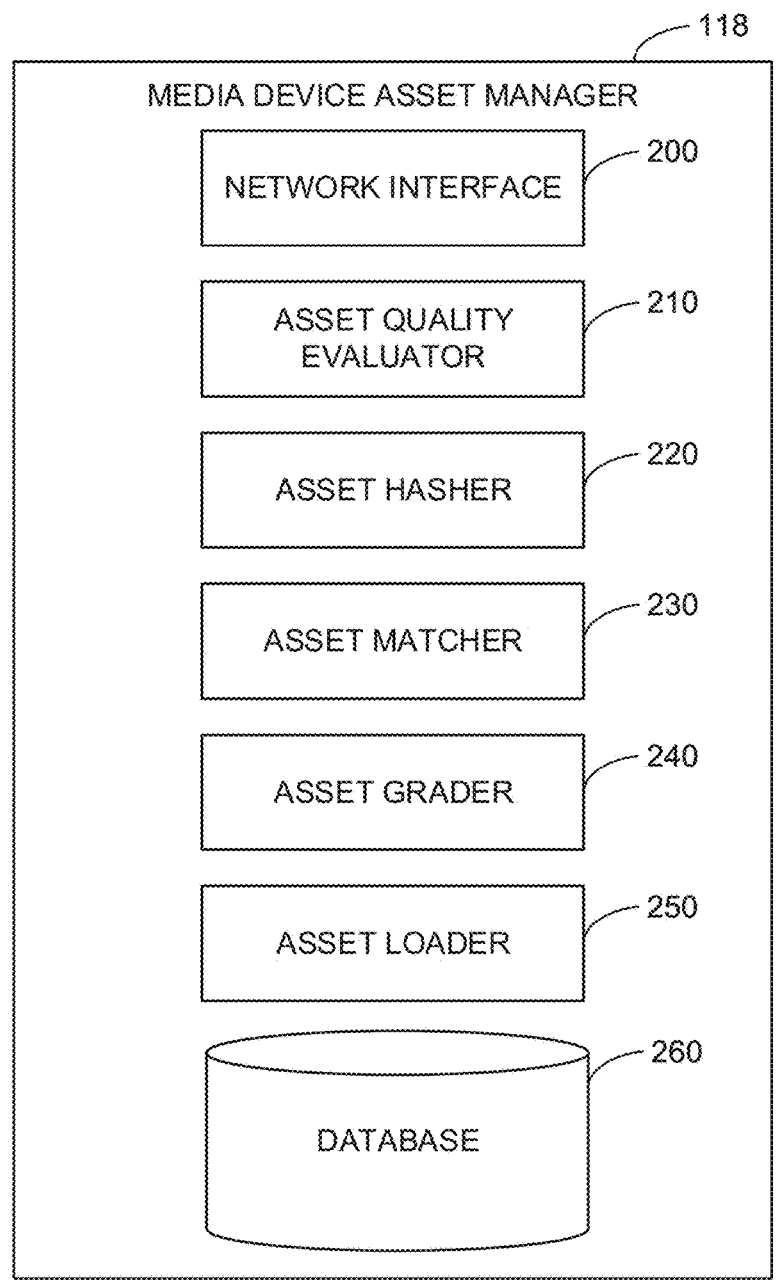
FIG. 2 is a block diagram of an example implementation of the media device asset manager of FIG. 1.

FIG. 2 is a block diagram of an example implementation of the example MDAM 118 of FIG. 1. The example MDAM 118 manages a media device asset database based on identifying media device assets obtained from media devices as database candidates and selecting one of the database candidates for storage in the media device asset database and subsequent measuring and/or monitoring by an AME. In the illustrated example of FIG. 2, the example MDAM 118 includes an example network interface 200, an example asset quality evaluator 210, an example asset hasher 220, an example asset matcher 230, an example asset grader 240, an example asset loader 250, and an example database 260.

In the illustrated example of FIG. 2, the MDAM 118 includes the network interface 200 to obtain information from and/or transmit information to the network 120 of FIG. 1. In the illustrated example, the network interface 200 implements a web server that receives the media device asset 112 from the media device 102 and/or the meter 110. In the illustrated example, the information included in the media device asset 112 is formatted as an HTTP message. However, any other message format and/or protocol may additionally or alternatively be used such as, for example, a file transfer protocol (FTP), a simple message transfer protocol (SMTP), an HTTP secure (HTTPS) protocol, etc. In some examples, the network interface 200 determines whether to continue monitoring a media device. For example, the network interface 200 may determine that the media devices 102, 104, 106 of FIG. 1 are not presenting the media 108 of FIG. 1, are not powered on, etc.

In the illustrated example of FIG. 2, the MDAM 118 includes the asset quality evaluator 210 to identify one or more media device assets as a database candidate. For example, the asset quality evaluator 210 may determine that the media device asset 112 of FIG. 1 is a duplicate syndicated media device asset, a duplicate proprietary media asset, or a syndicated duplicate of a proprietary media asset. For example, the asset quality evaluator 210 may increment a counter (e.g., a duplicate syndicated media device asset counter, etc.) corresponding to a syndicated media device asset when the media device asset is identified as a duplicate syndicated media device asset. In another example, the asset quality evaluator 210 may increment a counter (e.g., a duplicate proprietary media asset counter, etc.) corresponding to a proprietary media asset when the media device asset is identified as a duplicate proprietary media asset. In some examples, the asset quality evaluator 210 discards the media device asset when the media device asset is identified as a duplicate syndicated media device asset or a duplicate proprietary media asset. In some examples, the asset quality evaluator 210 replaces a stored proprietary media asset with the media device asset when the media device asset is determined to be a syndicated duplicate of the stored proprietary media asset.

In some examples, the asset quality evaluator 210 analyzes the media device asset 112 for continuity anomalies based on an extracted media identifier. For example, the asset quality evaluator 210 may identify an expected duration of the media 108 based on the media identifier 116. For example, the asset quality evaluator 210 may determine that the media 108 has an expected media presentation duration of 59 minutes and 36 seconds (i.e., 59.6 minutes). In some examples, the asset quality evaluator 210 composes an ideal database candidate based on the expected duration and an expected number of signatures for the expected duration. For example, the asset quality evaluator 210 may determine that the expected number of signatures for the media 108 is 35,740 (e.g., 59.6 minutes×600 signatures per minute=35,740 signatures), where a signature is to occur once every 100 milliseconds.

In some examples, the asset quality evaluator 210 compares the media device asset 112 of FIG. 1 to the ideal database candidate. For example, the asset quality evaluator 210 may determine that the media device asset 112 has a longer duration than the expected duration and, thus, indicating that the media device asset 112 includes pauses, rewinds, etc., of the media 108. In such an example, the asset quality evaluator 210 may identify the media device asset 112 as a disqualified media device asset. In some examples, the asset quality evaluator 210 discards identified disqualified media device assets.

In another example, the asset quality evaluator 210 may determine that the media device asset 112 has a shorter duration than the expected duration. For example, a presentation of the media 108 may have been stopped, fast forwarded, etc. In some examples, the asset quality evaluator 210 calculates a difference (e.g., a duration difference, etc.) between the duration of the media device asset 112 and the expected duration, compares the difference to a threshold, and determines whether the difference satisfies the threshold based on the comparison (e.g., the difference is greater than 60 seconds, 120 seconds, etc.). For example, the asset quality evaluator 210 may determine that the difference satisfies the threshold based on the difference being greater than 120 seconds. As a result, the asset quality evaluator 210 may discard the media device asset 112 based on the media device asset 112 having a high probability that a plurality of signatures 114 are missing from the media device asset 112. In another example, the asset quality evaluator 210 may discard the media device asset 112 based on the signatures 114 corresponding to a different language (e.g., English, French, German, etc.) than other media device assets being analyzed. For example, the asset quality evaluator 210 may disqualify the media device asset 112 for including French-based signatures when the language to be processed is English.

In some examples, the asset quality evaluator 210 selects a media device asset to process. For example, the asset quality evaluator 210 may select the media device asset 112 of FIG. 1 to analyze for continuity anomalies. In some instances, the asset quality evaluator 210 determines whether there is another media device asset to process. For example, the asset quality evaluator 210 may determine that there are additional media device assets from the media devices 102, 104, 106 that have not been processed.

In some examples, the asset quality evaluator 210 selects a timestamp of interest to process in a media device asset. For example, the asset quality evaluator 210 may select a first of ten timestamps to process within the media device asset 112. In such an example, the asset quality evaluator 210 may process a first timestamp corresponding to a first signature to detect a jump in PAS timestamps between the first timestamp and a second timestamp. In some instances, the asset quality evaluator 210 determines whether there is another timestamp to process in the media device asset.

In the illustrated example of FIG. 2, the MDAM 118 includes the asset hasher 220 to generate a hash table based on applying one or more hashing algorithms to one or more database candidates (e.g., one or more media device assets, etc.). In some examples, a hash table is a data structure which implements an associative array abstract data type, which is a structure that can map keys to values. In some instances, the asset hasher 220 generates a hash table by using a hash function to compute an index into an array of buckets or slots, from which the desired value can be found. The example asset hasher 220 may implement a hash function such as a message digest 5 hash function, a secure hash algorithm (SHA) (e.g., SHA-0, SHA-1, SHA-2, etc.), etc. For example, the asset hasher 220 may use a SHA-0 hash algorithm to map each signature 114 of the media device asset 112 of FIG. 1 to a slot that includes the media identifier 116 corresponding to the signature 114.

In the illustrated example of FIG. 2, the MDAM 118 includes the asset matcher 230 to perform database candidate to database candidate matching based on the hash table. For example, the asset matcher 230 may compare the media device asset 112 of FIG. 1 to another media device asset using a hash table generated by the asset hasher 220. In such an example, the asset matcher 230 may compare each signature 114 of the media device asset 112 to the hash table. For example, the asset matcher 230 may (1) apply a hashing algorithm (e.g., the same hashing algorithm used by the asset hasher 220 to generate the hash table, etc.) to the signature 114 to compute an index value and (2) compare the media identifier 116 corresponding to the signature 114 to a media identifier stored at the index value in the hash table. In such an example, the asset matcher 230 may determine that the media identifier 116 either matches or does not match the stored media identifier based on the comparison.

In some examples, the asset matcher 230 calculates a matching percentage corresponding to how well the media device asset 112 matches another database candidate based on the generated hash table. For example, the asset matcher 230 may calculate a matching percentage corresponding to how many signatures of the media device asset 112 have media identifiers 116 that match stored media identifiers in the generated hash table. In another example, the asset matcher 230 may calculate a match count (e.g., a hash count, etc.) corresponding to a number of the signatures 114 that have media identifiers 116 that match stored media identifiers in the generated hash table.

In the illustrated example of FIG. 2, the MDAM 118 includes the asset grader 240 to generate a grade for one or more database candidates. For example, the asset grader 240 may grade the media device asset 112 based on a strength of coverage. In such an example, the asset grader 240 may determine a grade for the media device asset 112 based on a valid hash count, a number of discrete hash matches, etc. The example asset grader 240 may assign a higher grader based on an increasing number of the valid hash count, the number of discrete hash matches, etc. In another example, the asset grader 240 may grade the media device asset 112 based on a duration of coverage. In such an example, the asset grader 240 may determine a grade for the media device 112 based on a duration of the signatures 114 compared to an expected duration of the media 108.

In yet another example, the asset grader 240 may determine a grade for the media device asset 112 based on a minimum duration coverage. In such an example, the asset grader 240 may fail to assign a grade to the media device asset 112 if a first duration difference between the duration of the signatures 114 and the expected duration satisfies a threshold (e.g., a duration difference greater than 60 seconds, 5 minutes, 10 minutes, etc.). For example, the asset grader 240 may fail to assign a grade to the media device asset 112 if the first duration difference is greater than 10 minutes. Alternatively, the example asset grader 240 may assign a lower grade to the media device asset 112 when the first duration difference satisfies the threshold compared to a grade assigned by the asset grader 240 to another media device asset with a corresponding second duration difference that does not satisfy the threshold. In some examples, the asset grader 240 selects a database candidate to be loaded into a database (e.g., a media device asset database) based on the grades. In such examples, the asset grader 240 identifies the selected database candidate as a reference media device asset. For example, the asset grader 240 may select the media device asset 112 to be loaded into a media device asset database based on assigning the media device asset 112 the highest grade compared to other media device assets.

In the illustrated example of FIG. 2, the MDAM 118 includes the asset loader 250 to process and store an identified database candidate (e.g., an identified signature, a reference media device asset, etc.) in a database. In some examples, the asset loader 250 processes the identified database candidate by trimming, cropping, etc., non-matching portions of the identified database candidate. For example, the asset loader 250 may remove the signature 114 included in the media device asset 112 that does not match the generated hash table. In some examples, the asset loader 250 stores the processed identified database candidate in the database 260 to be used by an AME for measuring and/or reporting operations corresponding to the media 108 of FIG. 1. In some examples, the asset loader 250 generates a report (e.g., a validation report) indicating the identified database candidate and a storage of the identified database candidate into the database 260.

In the illustrated example of FIG. 2, the MDAM 118 includes the database 260 to record data (e.g., media device assets, hash tables, media identification information, matching percentages, grades, rankings, etc.). In the illustrated example, the database 260 is a media device asset database. Alternatively, the example database 260 may be any other type of database. The example database 260 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 260 may additionally or alternatively be implemented by one or more double data rate (DDR) memories, such as DDR, DDR2, DDR3, DDR4, mobile DDR (mDDR), etc. The example database 260 may additionally or alternatively be implemented by one or more mass storage devices such as hard disk drive(s), compact disk drive(s), digital versatile disk drive(s), solid-state disk drive(s), etc. While in the illustrated example the database 260 is illustrated as a single database, the database 260 may be implemented by any number and/or type(s) of databases. Furthermore, the data stored in the database 260 may be in any data format such as, for example, binary data, comma delimited data, tab delimited data, structured query language (SQL) structures, etc. Alternatively, the example database 260 may be located externally to the MDAM 118.

While an example manner of implementing the MDAM 118 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 200, the example asset quality evaluator 210, the example asset hasher 220, the example asset matcher 230, the example asset grader 240, the example asset loader 250, the example database 260 and/or, more generally, the example MDAM 118 of FIG. 2 may be implemented by hardware, software, firmware and/or any combination of hardware, software and/or firmware. Thus, for example, any of the example network interface 200, the example asset quality evaluator 210, the example asset hasher 220, the example asset matcher 230, the example asset grader 240, the example asset loader 250, the example database 260 and/or, more generally, the example MDAM 118 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 200, the example asset quality evaluator 210, the example asset hasher 220, the example asset matcher 230, the example asset grader 240, the example asset loader 250, and/or the example database 260 is/are hereby expressly defined to include a non-transitory computer readable storage device or storage disk such as a memory, a digital versatile disk (DVD), a compact disk (CD), a Blu-ray disk, etc. including the software and/or firmware. Further still, the example MDAM 118 of FIG. 1 may include one or more elements, processes and/or devices in addition to, or instead of, those illustrated in FIG. 2, and/or may include more than one of any or all of the illustrated elements, processes and devices.

Figure 3:
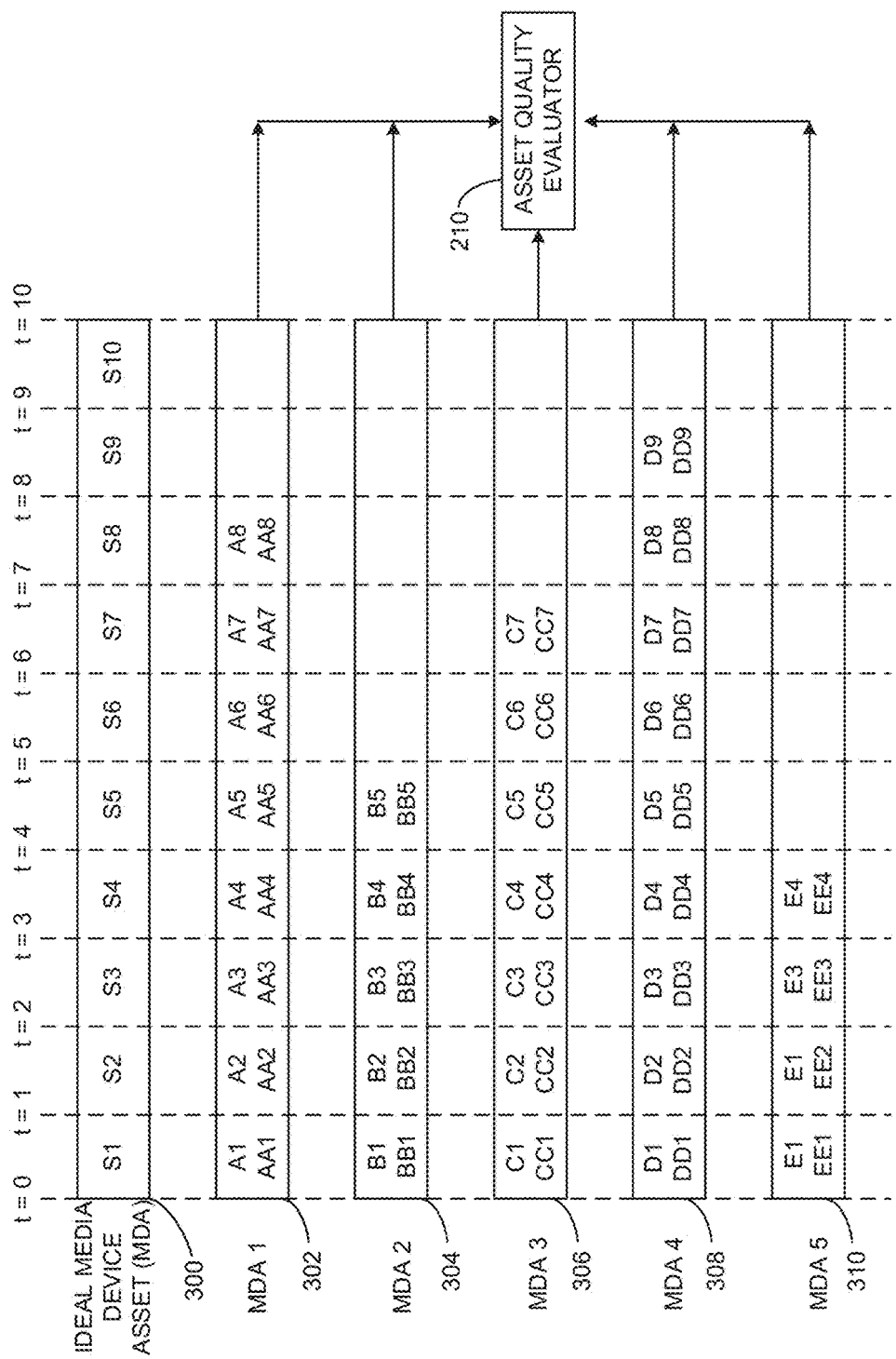
FIG. 3 is a schematic illustration of an example asset quality evaluator processing media device assets obtained from the media devices of FIG. 1.

FIG. 3 is a schematic illustration of the example asset quality evaluator 210 of FIG. 2 processing media device assets obtained from the media devices 102, 104, 106 of FIG. 1 for continuity anomalies. In the illustrated example, the asset quality evaluator 210 generates an ideal media device asset (MDA) 300 and compares the ideal MDA to a first through a fifth MDA 302, 304, 306, 308, 310. In the illustrated example, the first through the fifth MDAs 302, 304, 306, 308, 310 are obtained from the media devices 102, 104, 106 of FIG. 1. For example, the MDA 1 302 may correspond to the media device asset 112 of FIG. 1.

In the illustrated example of FIG. 3, the asset quality evaluator 210 composes the ideal MDA 300 based on an estimated duration of media included in a media identifier corresponding to the media. For example, the asset quality evaluator 210 may identify an estimated duration of the media 108 based on information included in the media identifier 116. In the illustrated example, the asset quality evaluator 210 determines that the expected duration of the media 108 corresponding to the first through the fifth MDAs 302, 304, 306, 308, 310 is ten time units, designated by t=0 to t=10. In the illustrated example, the asset quality evaluator 210 determines that the number of expected signatures for the duration of the media is ten signatures, where the first through the tenth expected signatures and corresponding media identifiers of the ideal MDA 300 are designated by S1, S2, S3, S4, S5, S6, S7, S8, S9, and S10. In the illustrated example, the MDA 1 302 has a duration of eight time units, the MDA 2 304 has a duration of five time units, the MDA 3 306 has a duration of seven time units, the MDA 4 308 has a duration of nine time units, and the MDA 5 310 has a duration of four time units.

In the illustrated example, the MDA 1 302 includes eight signatures designated by A1 through A8 and eight corresponding media identifiers designated by AA1 through AA8. For example, A1 may correspond to the signature 114 and AA1 may correspond to the media identifier 116 of FIG. 1, where the media identifier 116 includes a corresponding PAS timestamp. In the illustrated example, the MDA 2 304 includes five signatures designated by B1 through B5 and five corresponding media identifiers designated by BB1 through BB5. In the illustrated example, the MDA 3 306 includes seven signatures designated by C1 through C7 and seven corresponding media identifiers designated by CC1 through CC7. In the illustrated example, the MDA 4 308 includes nine signatures designated by D1 through D9 and nine corresponding media identifiers designated by DD1 through DD9. In the illustrated example, the MDA 5 310 includes four signatures designated by E1 through E4 and four corresponding media identifiers designated by EE1 through EE4.

In the illustrated example, the asset quality evaluator 210 processes each of the MDAs 302, 304, 306, 308, 310 for continuity anomalies. For example, the asset quality evaluator 210 may compare a PAS timestamp of each signature to a PAS timestamp of a preceding signature and/or a PAS timestamp of a following signature. In the illustrated example, the asset quality evaluator 210 compares the fourth signature B4 of the MDA 2 304 to the third signature B3 of the MDA 2 304. For example, the asset quality evaluator 210 may determine that the fourth signature B4 of the MDA 2 304 has a PAS timestamp that precedes a PAS timestamp of the third signature B3 of the MDA 2 304. In such an example, the asset quality evaluator 210 may determine that the fourth signature B4 of the MDA 2 304 indicates a jump in PAS timestamps has occurred. In response to determining that there is a jump in the PAS timestamps of the MDA 2 304, the example asset quality evaluator 210 may identify the MDA 2 304 as a disqualified MDA. As a result, the example asset quality evaluator 210 may discard the MDA 2 304.

In some examples, the asset quality evaluator 210 discards an MDA based on a duration of the MDA. For example, the asset quality evaluator 210 may calculate a duration difference between a duration of the ideal MDA 300 and a duration of the MDA 5 310. In such an example, the asset quality evaluator 210 may compare the duration difference to a threshold and determine whether the duration difference satisfies the threshold based on the comparison. In the illustrated example, the asset quality evaluator 210 calculates a duration difference between the ideal MDA 300 and the MDA 5 310 to be six time units (e.g., ten time units (i.e., t=10)–four time units (i.e., t=4), etc.). In the illustrated example, the asset quality evaluator 210 determines that the calculated duration difference of six time units is greater than the threshold of two time units and, thus, satisfies the threshold. In response to the calculated duration difference satisfying the threshold, the example asset quality evaluator 210 may identify the MDA 5 310 as a disqualified MDA. As a result, the example asset quality evaluator 210 may discard the MDA 5 310. In response to discarding the MDA 2 304 and the MDA 5 310, the example asset quality evaluator 210 may identify the MDA 1 302, the MDA 3 306, and the MDA 4 308 as database candidates.

In some examples, the asset quality evaluator 210 identifies a disqualified MDA based on a duration of an MDA. For example, the asset quality evaluator 210 may compare a duration of the MDA 5 310 to a threshold (e.g., a duration greater than five time units, seven time units, etc.) and determine whether the duration satisfies the threshold. In the illustrated example, the asset quality evaluator 210 identifies the MDA 5 310 as a disqualified MDA based on the duration of the MDA 5 310 of four time units not satisfying an example threshold of six time units.

Figure 4:
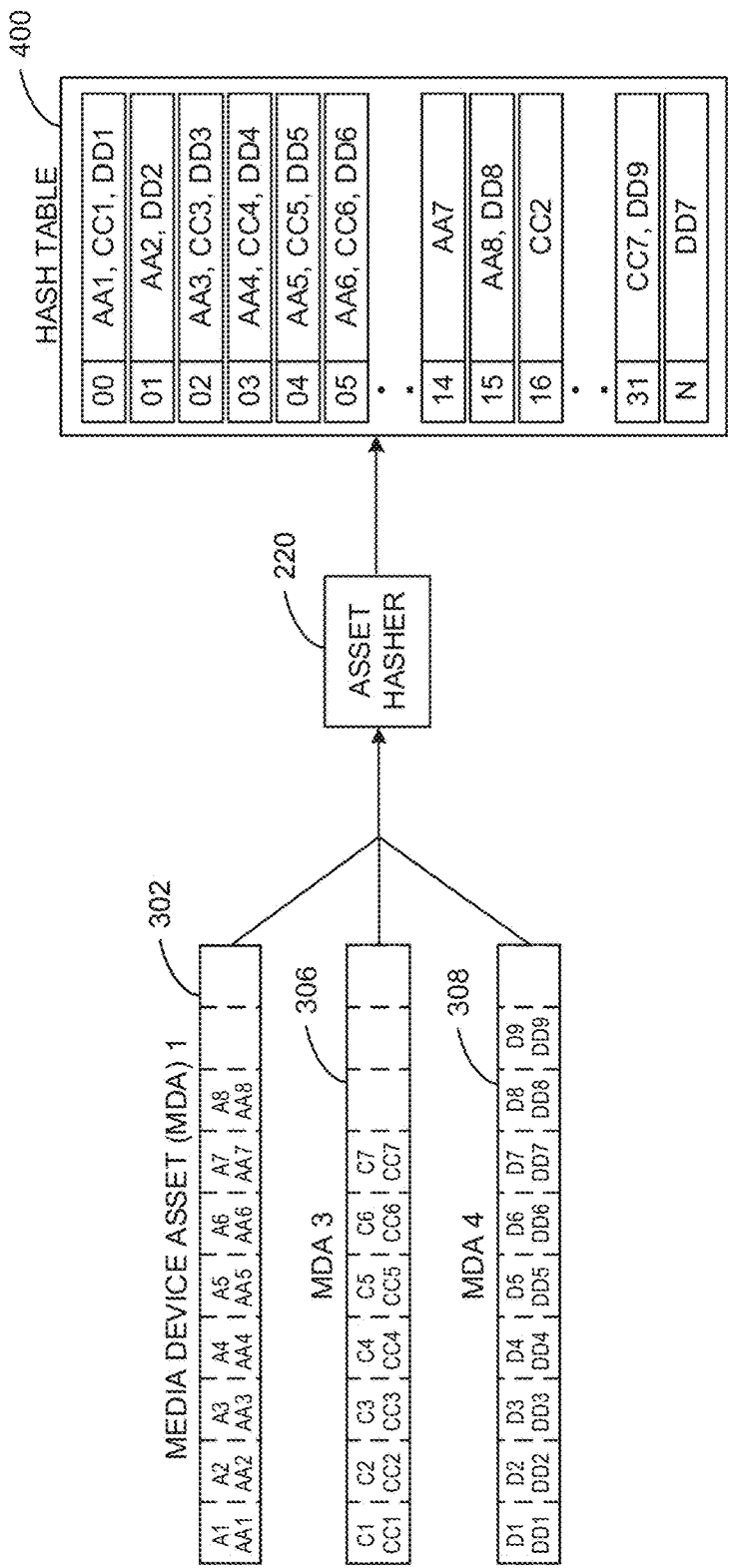
FIG. 4 is a schematic illustration of an example asset hasher processing the media device assets of FIG. 3 obtained from the media devices of FIG. 1.

FIG. 4 is a schematic illustration of the example asset hasher 220 of FIG. 2 generating a hash table 400 based on performing one or more hashing operations on the media device asset (MDA) 1 302, the MDA 3 306, and the MDA 4 308 of FIG. 3. In the illustrated example, the MDA 1 302, the MDA 3 306, and the MDA 4 308 are identified as database candidates. For example, the asset quality evaluator 210 may identify the MDA 1 302, the MDA 3 306, and the MDA 4 308 as database candidates based on not being identified as a disqualified MDA candidate (e.g., does not include a continuity anomaly, a duration difference does not satisfy a threshold, a duration satisfies a threshold, etc.).

In the illustrated example of FIG. 4, the example asset hasher 220 applies one or more hashing algorithms, operations, etc., to each signature of the MDA 1 302, the MDA 3 306, and the MDA 4 308. For example, the asset hasher 220 may apply a hashing algorithm to the first signature A1, the second signature A2, the third signature A3, the fourth signature A4, the fifth signature A5, the sixth signature A6, the seventh signature A7, and the eighth signature A8 of the MDA 1 302. In such an example, the asset hasher 220 may map each of the signatures to an index in the hash table 400. In the illustrated example, the asset hasher 220 maps the first signature A1 of the MDA 1 302 to index 00 and stores the corresponding media identifier AA1 of the first signature A1 at the index 00.

In the illustrated example, the asset hasher 220 generates the hash table 400 to include more indices than signatures. For example, the asset hasher 220 may generate the hash table 400 with a significant number of indices greater than a possible number of signatures (e.g., generate a table with 1,000,000 indices compared to a possible number of 1,000 signatures, etc.) to reduce a probability of a collision event. In some examples, the asset hasher 220 implements one or more collision resolution algorithms when generating the hash table 400.

Figure 5:
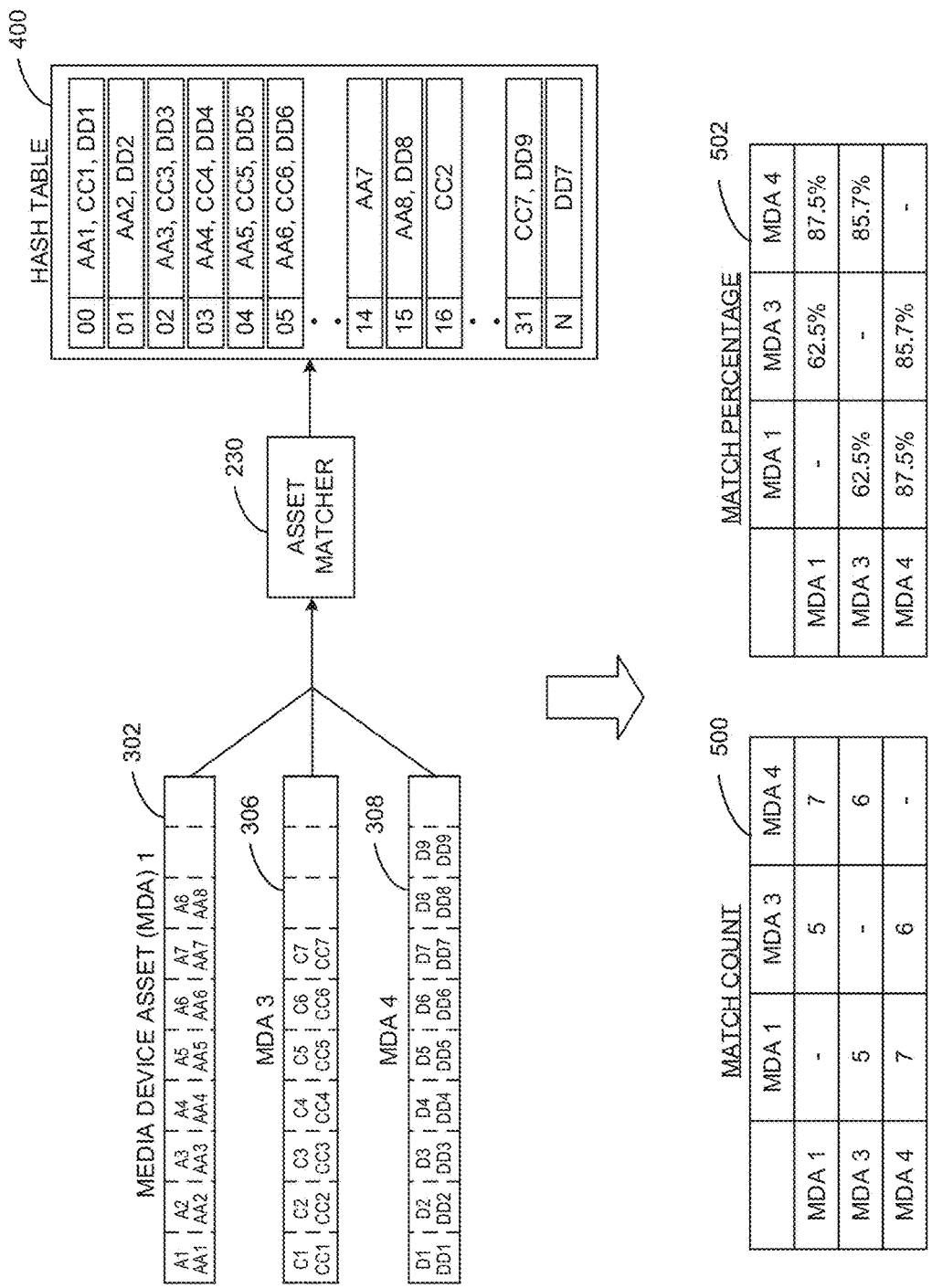
FIG. 5 is a schematic illustration of an example asset matcher processing the media device assets of FIG. 3 obtained from the media devices of FIG. 1.

FIG. 5 is a schematic illustration of the example asset matcher 230 of FIG. 2 comparing the MDA 1 302, the MDA 3 306, and the MDA 4 308 of FIG. 3 to each other based on the hash table 400 of FIG. 4. In the illustrated example, the asset matcher 230 compares each of the MDAs 302, 306, 308 to the hash table 400. For example, the asset matcher 230 compares (e.g., iteratively compares, etc.) each signature in each of the MDAs 302, 306, 308 to the hash table 400 and calculates a match count based on the comparison as shown in a match count table 500.

In the illustrated example, the asset matcher 230 compares the first through the eighth signatures A1-A8 of the MDA 1 302 to the hash table 400. For example, the asset matcher 230 applies a hashing algorithm to the first signature A1 of the MDA 1 302 and maps the first signature to the index 00. In the illustrated example, the asset matcher 230 determines that the index 00 includes the media identifiers AA1, CC1, and DD1. As a result, the example asset matcher 230 determines that the first signature A1 of the MDA 1 302 also matches the first signature C1 of the MDA 3 306 and the first signature D1 of the MDA 4 308. In such an example, the first signature A1 of the MDA 1 302 matching the first signature C1 of the MDA 3 306 represents a valid hash count.

In the illustrated example, the asset matcher 230 generates the match count table 500 based on calculating a number of valid hash counts for each matching process. For example, the asset matcher 230 compares the signatures in the MDA 1 302 to the hash table 400. As depicted in the match count table 500, five signatures in the MDA 1 302 match the MDA 3 306 and seven signatures in the MDA 1 302 match the MDA 4 308. In another example, the asset matcher 230 compares the signatures in the MDA 3 306 to the hash table 400. As depicted in the match count table 500, five signatures in the MDA 3 306 match the MDA 1 302 and six signatures in the MDA 3 306 match the MDA 4 308.

In the illustrated example, the asset matcher 230 generates the match percentage table 502 based on the match count table 500. In the illustrated example of table 502, the asset matcher 230 calculates a matching percentage of 62.5% when comparing the signatures of the MDA 1 302 to the MDA 3 306. For example, the asset matcher 230 calculates a valid hash count of five based on determining that the signatures A1, A3, A4, A5, and A6 of the MDA 1 302 match the signatures C1, C3, C4, C5, and C6 of the MDA 3 306. In such an example, the asset matcher 230 calculates a matching percentage of 62.5% based on the valid hash count with respect to the total number of signatures (e.g., 5 valid hash counts÷8 total signatures=62.5%).

In another example, the asset matcher 230 calculates a valid hash count of seven based on determining that the signatures A1, A2, A3, A4, A5, A6, and A8 of the MDA 1 302 match the signatures D1, D2, D3, D4, D5, D6, and D8 of the MDA 4 308. In such an example, the asset matcher 230 calculates a matching percentage of 87.5% based on the valid hash count with respect to the total number of signatures (e.g., 7 valid hash counts÷8 total signatures=87.5%).

In some examples, the asset grader 240 assigns, generates, etc., a grade for each of the MDA 1 302, the MDA 3 306, and the MDA 4 308 based on the match count table 500, the match percentage table 502, etc. For example, the asset grader 240 may assign a higher grade to the MDA 4 308 based on the MDA 4 308 having a total valid hash count of 13 (e.g., 7 valid hash counts compared to MDA 1 302+6 valid hash counts compared to MDA 3 306=13 total valid hash counts), which is greater than a total valid hash count of 12 for the MDA 1 302 and a total valid hash count of 11 for the MDA 3 306.

In another example, the asset grader 240 may assign a higher grade to the MDA 4 308 based on the MDA 1 302 and the MDA 1 306 having a higher match percentage to MDA 4 308 than any other MDA. For example, the MDA 1 302 matches the MDA 4 308 the best with a match percentage of 87.5% while only matching the MDA 3 306 with a match percentage of 62.5%. In another example, the MDA 3 306 matches the MDA 4 308 the best with a match percentage of 85.7% while only matching the MDA 1 302 with a match percentage of 62.5%. As a result, the example asset grader 240 may identify the MDA 4 308 as the best candidate based on multiple MDA matching the MDA 4 308 the best.

In some examples, the asset grader 240 generates a grade based on determining a matched duration. For example, the asset grader 240 may determine that the MDA 4 308 includes eight signatures that match at least one signature in another MDA. For example, the asset grader 240 may determine that the signatures D1, D2, D3, D4, D5, D6, D8, and D9 match at least one of the signatures included in the MDA 1 302 and the MDA 3 306. In such an example, the asset grader 240 may calculate the matched duration to be eight time units corresponding to the eight signatures that match at least one other signature in another MDA.

In some examples, the asset grader 240 generates a grade based on calculating a difference between an expected duration of media and a matched duration of the media. For example, the asset grader 240 may determine that the matched duration of the MDA 4 308 is eight time units for media. In such an example, the asset grader 240 may determine that an expected duration of the media is ten time units. In such an example, the asset grader 240 may calculate a difference between the expected duration and the matched duration to be two time units (e.g., ten time units corresponding to the expected duration–eight time units corresponding to the matched duration=two time units, etc.). In response to calculating the difference, the example asset grader 240 may compare the difference to a threshold, and determine whether the difference satisfies the threshold (e.g., the difference is less than two time units, less than four time units, etc.). In such an example, the asset grader 240 may determine that the difference of two time units is less than an example threshold of three time units and, thus, satisfies the threshold.

Figure 6:
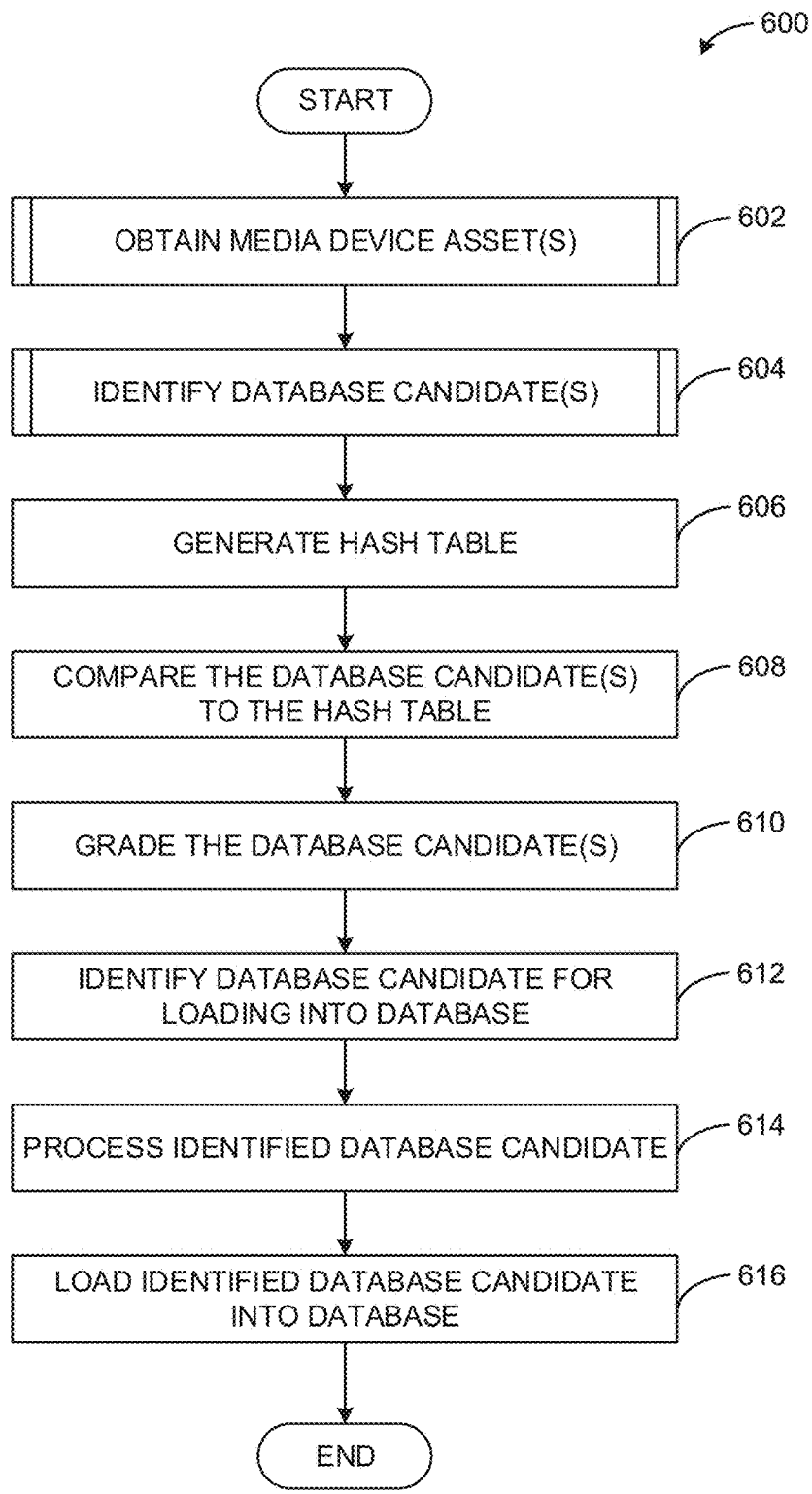
FIGS. 6-8 are flowcharts representative of example methods that may be used to implement the example media device asset manager of FIGS. 1-2.
Figure 7:
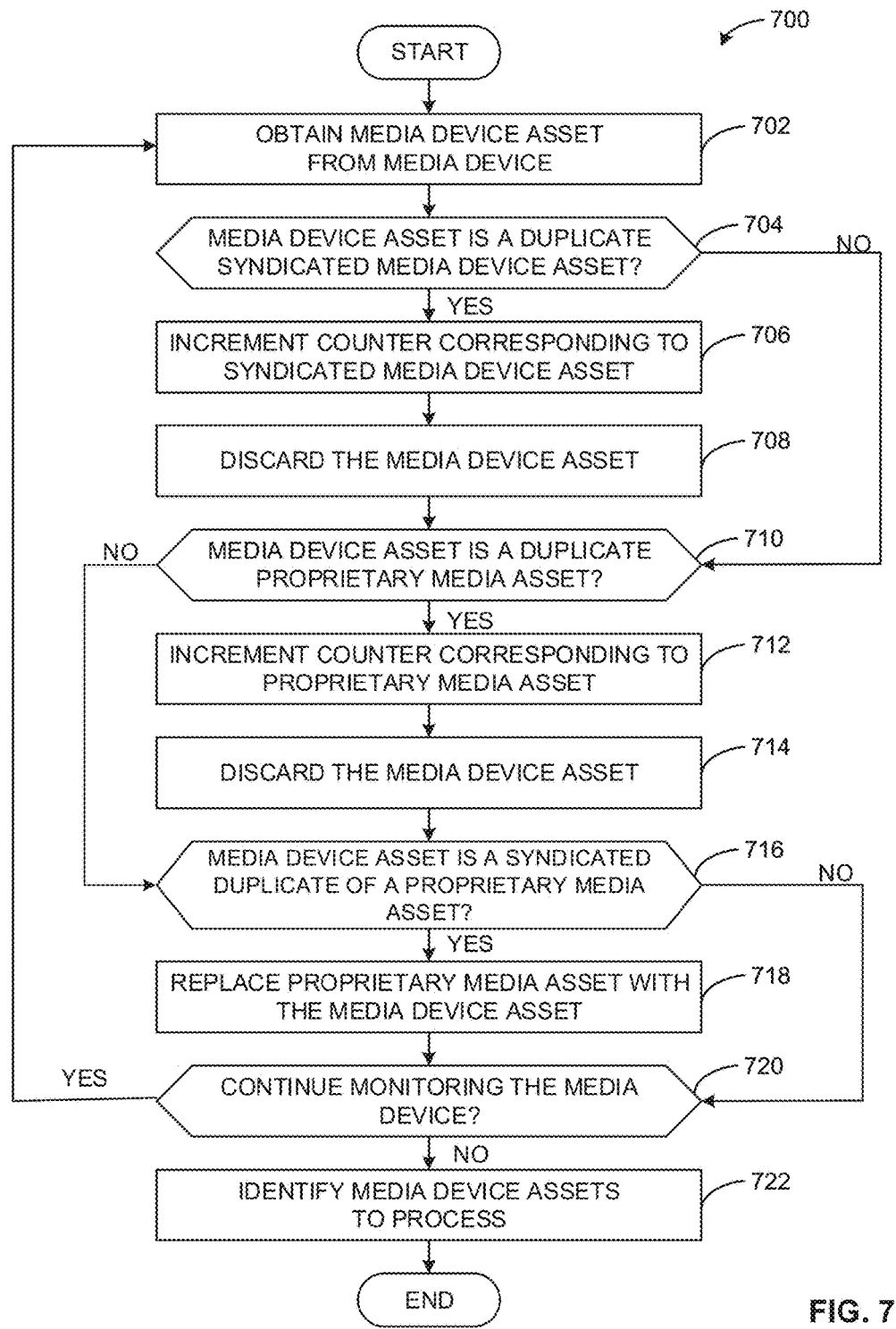
Figure 8:
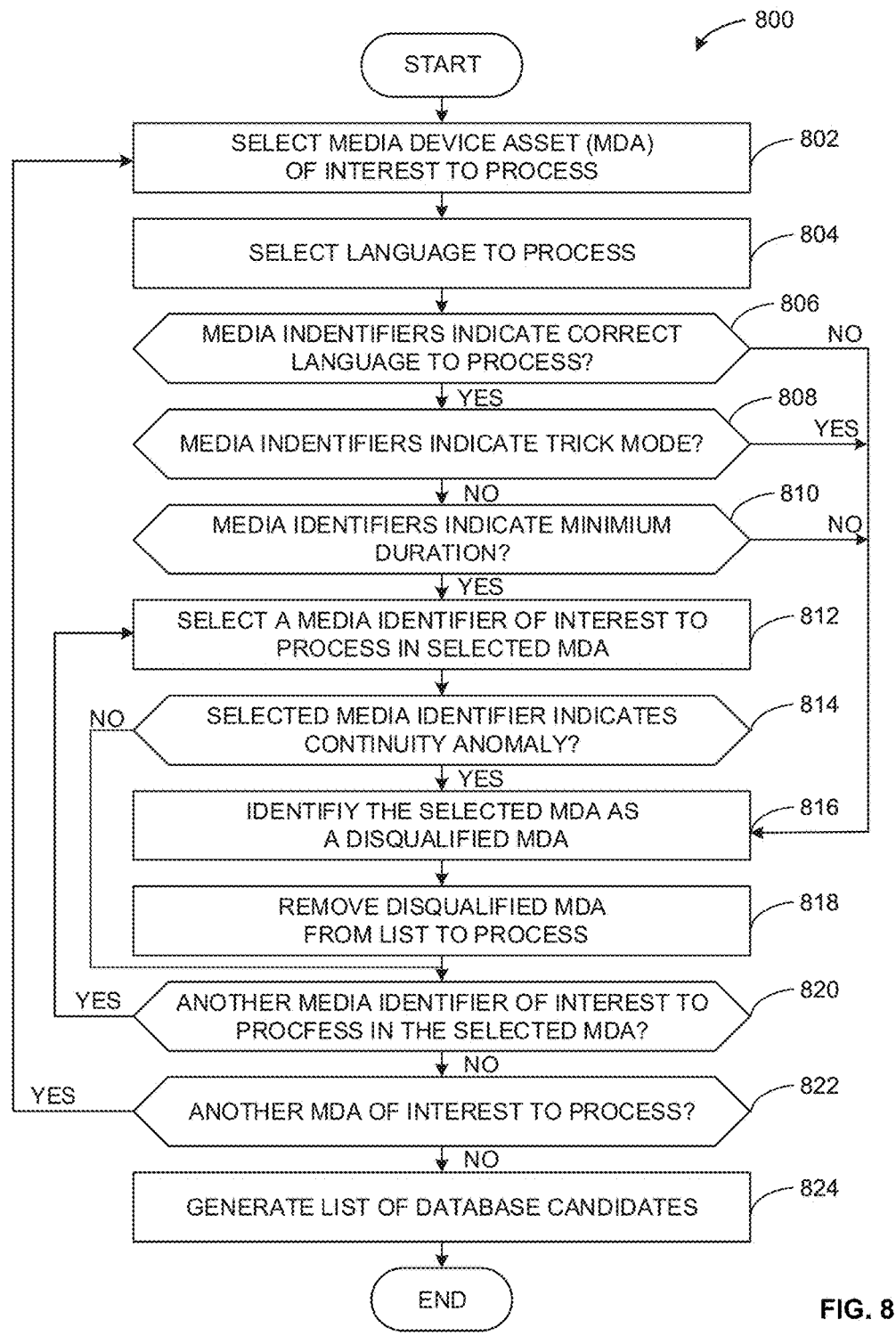

Flowcharts representative of example machine readable instructions for implementing the MDAM 118 of FIGS. 1-2 are shown in FIGS. 6-8. In these examples, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6-8, many other methods of implementing the example MDAM 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 6 is a flowchart representative of an example method 600 that may be performed by the example MDAM 118 of FIGS. 1-2 to identify a media device asset to be loaded into a media device asset database for AME measurement and/or reporting. The example method 600 begins at block 602 when the example MDAM 118 obtains media device asset(s). For example, the network interface 200 may obtain one or more media device assets from the media devices 102, 104, 106 of FIG. 1.

At block 604, the example MDAM 118 identifies database candidate(s). For example, the asset quality evaluator 210 may identify the MDA 1 302, the MDA 3 306, and the MDA 4 308 of FIG. 3 to be database candidate assets based on not being identified as disqualified media device assets. In such an example, the asset quality evaluator 210 may discard the MDA 2 304 and the MDA 5 310 based on being identified disqualified media device assets. At block 606, the example MDAM 118 generates a hash table. For example, the asset hasher 220 may generate the hash table 400 of FIGS. 4-5 based on applying one or more hashing algorithms to the MDA 1 302, the MDA 3 306, and the MDA 4 308.

At block 608, the example MDAM 118 compares the database candidate(s) to the hash table. For example, the asset matcher 230 may compare the MDA 1 302, the MDA 3 306, and the MDA 4 308 to the hash table 400. At block 610, the example MDAM 118 grades the database candidate(s). For example, the asset grader 240 may rank, grade, etc., the MDA 1 302, the MDA 3 306, and the MDA 4 308 based on the match count table 500, the match percentage table 502, etc.

At block 612, the example MDAM 118 identifies a database candidate for loading into a database. For example, the asset grader 240 may identify the MDA 4 308 as a reference media device asset to be stored into the database 260 for AME measurement and/or reporting.

At block 614, the example MDAM 118 processes the identified database candidate. For example, the asset loader 250 may trim, crop, etc., the non-matching portions of the MDA 4 308. In such an example, the asset loader 250 may not remove any portion of the MDA 4 308 based on each signature of the MDA 4 308 matching at least one other signature of the MDA 1 302, the MDA 3 304, etc. Alternatively, the example asset loader 250 may remove the second signature D2 of the MDA 4 308 based on the second signature D2 only matching one and not both of the MDA 1 302 and the MDA 304 (e.g., a signature that does not match all other candidates may be trimmed, cropped, etc.).

At block 616, the example MDAM 118 loads the identified database candidate into the database. For example, the asset loader 250 may load the MDA 4 308 into the database 260 to be used as a reference media device asset for AME measurement and/or reporting.

Additional detail in connection with obtaining media device asset(s) (FIG. 6, block 602) is shown in FIG. 7. FIG. 7 is a flowchart representative of an example method 700 that may be performed by the example MDAM 118 of FIGS. 1-2 to identify one or more media device assets to process for media device asset qualification. The example method 700 begins at block 702 when the example MDAM 118 obtains a media device asset from a media device. For example, the network interface 200 may obtain the media device asset 112 of FIG. 1 from the media device 102 of FIG. 1 via the network 120 of FIG. 1. In another example, the network interface 200 may obtain the MDA 1 302, the MDA 2 304, the MDA 3 306, the MDA 4 308, and/or the MDA 5 310 of FIG. 3 from the media devices 102, 104, 106 of FIG. 1.

At block 704, the example MDAM 118 determines whether the media device asset is a duplicate syndicated media device asset. For example, the asset quality evaluator 210 may compare the media device asset 112 of FIG. 1 to one or more media device assets in the database 260 of FIG. 2. In such an example, the asset quality evaluator 210 may determine that the media device asset 112 of FIG. 1 is a duplicate syndicated media device asset based on matching a syndicated media device asset in the database 260.

If, at block 704, the example MDAM 118 determines that the media device asset is not a duplicate syndicated media device asset, control proceeds to block 710 to determine whether the media device asset is a duplicate proprietary media asset.

If, at block 704, the example MDAM 118 determines that the media device asset is a duplicate syndicated media device asset, then, at block 706, the MDAM 118 increments a counter corresponding to a syndicated media device asset. For example, the asset quality evaluator 210 may increment a duplicate syndicated media device asset counter based on the media device asset 112 matching a syndicated media device asset in the database 260.

At block 708, the example MDAM 118 discards the media device asset. For example, asset quality evaluator 210 may discard the media device asset 112 of FIG. 1 when the asset quality evaluator 210 increments the duplicate syndicated media device asset counter.

At block 710, the example MDAM 118 determines whether the media device asset is a duplicate proprietary media asset. For example, the asset quality evaluator 210 may compare the media device asset 112 of FIG. 1 to the database 260. In such an example, the asset quality evaluator 210 may determine that the media device asset 112 of FIG. 1 is a duplicate proprietary media asset based on matching a proprietary media asset in the database 260.

If, at block 710, the example MDAM 118 determines that the media device asset is not a duplicate proprietary media asset, control proceeds to block 716 to determine whether the media device asset is a syndicated duplicate of a proprietary media asset.

If, at block 710, the example MDAM 118 determines that the media device asset is a duplicate proprietary media asset, then, at block 712, the MDAM 118 increments a counter corresponding to a proprietary media asset. For example, the asset quality evaluator 210 may increment a duplicate proprietary media asset counter based on the media device asset 112 matching a proprietary media asset in the database 260.

At block 714, the example MDAM 118 discards the media device asset. For example, asset quality evaluator 210 may discard the media device asset 112 of FIG. 1 when the asset quality evaluator 210 increments the duplicate proprietary media asset counter.

At block 716, the example MDAM 118 determines whether the media device asset is a syndicated duplicate of a proprietary media asset. For example, the asset quality evaluator 210 may compare the media device asset 112 of FIG. 1 to the database 260. In such an example, the asset quality evaluator 210 may determine that the media device asset 112 of FIG. 1 is a syndicated duplicate (e.g., obtained from a media device, etc.) of a proprietary asset based on the media device asset 112 matching a proprietary media asset in the database 260.

If, at block 716, the example MDAM 118 determines that the media device asset is not a syndicated duplicate of a proprietary media asset, control proceeds to block 720 to determine whether to continue monitoring the media device.

If, at block 716, the example MDAM 118 determines that the media device asset is a syndicated duplicate of a proprietary media asset, then, at block 718, the MDAM 118 replaces a proprietary media asset with the media device asset. For example, the asset quality evaluator 210 may replace a proprietary media asset stored in the database 260 with the media device asset 112 of FIG. 1 when the media device asset 112 matches a proprietary media asset stored in the database 260.

At block 720, the example MDAM 118 determines whether to continue monitoring the media device. For example, the network interface 200 may determine that the media devices 102, 104, 106 of FIG. 1 are no longer presenting the media 108 of FIG. 1.

If, at block 720, the example MDAM 118 determines to continue monitoring the media device, control returns to block 702 to obtain another media device asset from the media device. If, at block 720, the example MDAM 118 determines not to continue monitoring the media device, then, at block 722, the MDAM 118 identifies media device assets to process. For example, the asset quality evaluator 210 may identify the media device asset 112 of FIG. 1 to undergo media device asset qualification. For example, the asset quality evaluator 210 may identify the media device asset 112 to undergo media device asset qualification when the asset quality evaluator 210 determines that the media device asset 112 is not one of a duplicate syndicated media device asset, a duplicate proprietary media asset, or a syndicated duplicate of a proprietary media asset. For example, the media device asset 112 may not be in the database 260. In another example, the media device asset 112 may correspond to a database candidate stored in a temporary database.

Additional detail in connection with identifying database candidate(s) (FIG. 6, block 604) is shown in FIG. 8. FIG. 8 is a flowchart representative of an example method 800 that may be performed by the example MDAM 118 of FIGS. 1-2 to identify one or more media device assets as a database candidate to entered into a media device asset database for AME measurement and/or reporting. The example method 800 begins at block 802 when the example MDAM 118 selects a media device asset of interest to process. For example, the asset quality evaluator 210 may select the MDA 1 302 of FIG. 3 to process.

At block 804, the example MDAM 118 selects a language to process. For example, the asset quality evaluator 210 may select the English language to process the signatures A1-A8 of the MDA 1 302.

At block 806, the example MDAM 118 determines whether media identifiers indicate a correct language to process. For example, the asset quality evaluator 210 may determine that the media identifiers AA1-AA8 of the MDA 1 302 indicate that the signatures A1-A8 of the MDA 1 302 are English-based signatures. As a result, the example asset quality evaluator 210 may determine that the media identifiers AA1-AA8 indicate that the correct language is being processed for the corresponding signatures A1-A8 of the MDA 1 302.

If, at block 806, the example MDAM 118 determines that the media identifiers do not indicate the correct language to process, control proceeds to block 816 to identify the selected MDA as a disqualified MDA. If, at block 806, the example MDAM 118 determines that the media identifiers indicate the correct language to process, then, at block 808, the MDAM 118 determines whether the media identifiers indicate trick mode.

At block 808, the example MDAM 118 determines whether the media identifiers indicate trick mode. For example, the asset quality evaluator 210 may determine that one or more of the media identifiers AA1-AA8 of the MDA 1 302 indicate trick mode based on media-identifying metadata in the one or more media identifiers AA1-AA8.

If, at block 808, the example MDAM 118 determines that the media identifiers indicate trick mode, control proceeds to block 816 to identify the selected MDA as a disqualified MDA. If, at block 808, the example MDAM 118 determines that the media identifiers do not indicate trick mode, then, at block 810, the MDAM 118 determines whether the media identifiers indicate a minimum duration. For example, the asset quality evaluator 210 may determine that the MDA 1 302 has a duration of eight time units based on the PAS timestamps included in the media identifiers AA1-AA8 of FIG. 3, where the duration is greater than an example minimum duration threshold of five time units.

If, at block 810, the example MDAM 118 determines that the media identifiers do not indicate a minimum duration, control proceeds to block 816 to identify the selected MDA as a disqualified MDA. If, at block 810, the example MDAM 118 determines that the media identifiers do indicate a minimum duration, then, at block 812, the MDAM 118 selects a media identifier of interest to process in the selected MDA. For example, the asset quality evaluator 210 may select the media identifier AA1 of the MDA 1 302 of FIG. 3.

At block 814, the example MDAM 118 determines whether the selected media identifier indicates a continuity anomaly. For example, the asset quality evaluator 210 may compare a first PAS timestamp corresponding to the media identifier AA1 of the MDA 1 302 and determine whether a second timestamp corresponding to the media identifier AA2 of the MDA 1 302 precedes the media identifier AA1. In such an example, if the second timestamp precedes the first timestamp, then the example asset quality evaluator 210 may determine that there is a jump in PAS timestamps (e.g., a viewing operation such as a rewind, fast-forward, etc., may have occurred, etc.).

If, at block 814, the example MDAM 118 determines that the selected media identifier does not indicate a continuity anomaly, control proceeds to block 820 to select another media identifier of interest. If, at block 814, the example MDAM 118 determines that the selected media identifier does indicate a continuity anomaly, then, at block 816, the MDAM 118 identifies the selected MDA as a disqualified MDA. For example, the asset quality evaluator 210 may identify the MDA 5 310 based on the media identifiers E1-E4 indicating an incorrect language to process, trick mode, not satisfying a minimum duration threshold, etc.

At block 818, the example MDAM 118 removes the disqualified MDA from a list to process. For example, the asset quality evaluator 210 may remove the MDA 2 304 and/or the MDA 5 310 from a list to process based when the MDA 2 304 and/or the MDA 5 310 are identified as disqualified MDAs.

At block 820, the example MDAM 118 determines whether there is another media identifier of interest to process in the selected MDA. For example, the asset quality evaluator 210 may determine that the media identifiers AA3-AA8 of the MDA 1 302 have not yet been processed after processing the media identifiers AA1-AA2 of the MDA 1 302.

If, at block 820, the example MDAM 118 determines that there is another media identifier of interest to process in the selected MDA, control returns to block 812 to select another media identifier of interest to process in the selected MDA. If, at block 820, the example MDAM 118 determines that there is not another media identifier of interest to process in the selected MDA, then, at block 822, the MDAM 118 determines whether there is another MDA of interest to process. For example, the asset quality evaluator 210 may determine that the MDA 2 304, the MDA 3 306, the MDA 4 308, and/or the MDA 5 310 have not yet been processed after processing the MDA 1 302 of FIG. 3.

If, at block 822, the example MDAM 118 determines that there is another MDA of interest to process, control returns to block 802 to select another MDA of interest to process. If, at block 822, the example MDAM 118 determines that there is not another MDA of interest to process, then, at block 824, the MDAM 118 generates a list of database candidates. For example, the asset quality evaluator 210 may generate a list of database candidates including the MDA 1 302, the MDA 3 306, and the MDA 4 308 based on not being identified as a disqualified MDA. In some examples, the asset quality evaluator 210 may generate a list that does not include any database candidates. For example, the asset quality evaluator 210 may identify each MDA of interest to be a disqualified MDA. In response to generating a list of database candidates, the example method 800 concludes.

Figure 9:
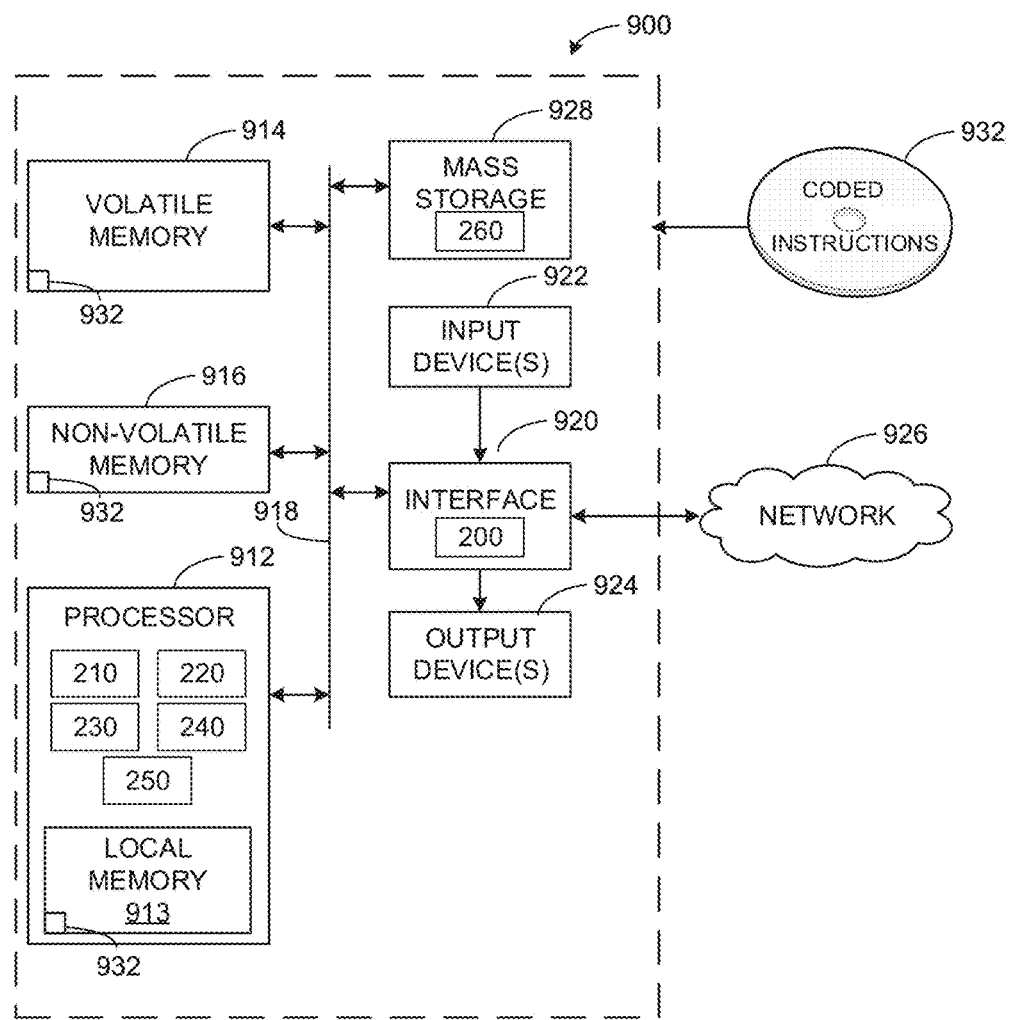
FIG. 9 is a block diagram of an example processing platform structured to execute the example machine readable instructions of FIGS. 6-8 to implement the media device asset manager of FIGS. 1 and 2.

FIG. 9 is a block diagram of an example processor platform 900 capable of executing the instructions of FIGS. 6-8 to implement the MDAM 118 of FIGS. 1-2. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the example asset quality evaluator 210, the example asset hasher 220, the example asset matcher 230, the example asset grader 240, and the example asset loader 250.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface. The interface circuit 920 implements the example network interface 200.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The example mass storage device 928 implements the example database 260.

The coded instructions 932 of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that identify media device assets for AME measurement and/or reporting based on obtaining media device assets from a plurality of media devices. By identifying a media device asset for AME measurement and/or reporting based on processing multiple media device assets, an AME can improve available memory storage by storing a reduced number of media device assets. Moreover, by identifying disqualified media device assets, the AME can improve memory and processor utilization (e.g., increase available memory storage and/or calculation resources) due to performing media device asset qualification on a fewer number of database candidates.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    an asset hasher to generate a hash table using candidate media device assets generated by media devices during respective presentations of media at the media devices, the candidate media device assets including a signature and a media identifier that identifies the media, wherein the media does not have a reference signature in a reference database;
    an asset matcher to calculate one or more counts of matches of A) signature and a media identifier of a first one of the candidate media device assets and B) respective signatures and media identifiers of multiple ones of the remaining candidate media device assets using the hash table;
    an asset grader to, after the one or more counts of matches are calculated, identify the signature of the first one of the candidate media device assets as the reference signature based on the one or more counts of matches; and
    an asset loader to load the reference signature into the reference database after identifying the signature of the first one of the candidate media device assets as the reference signature.

2. The apparatus of claim 1, further including an asset quality evaluator to disqualify one or more of the candidate media device assets when a jump in a timestamp is identified.

3. The apparatus of claim 1, further including an asset quality evaluator to disqualify one or more candidate media device assets when a corresponding media identifier indicates an incorrect language.

4. The apparatus of claim 1, further including an asset quality evaluator to disqualify one or more candidate media device assets when the one or more candidate media device assets fail to satisfy a minimum duration threshold.

5. The apparatus of claim 1, wherein the asset grader is to grade the candidate media device assets based on a difference between an expected duration of the media and a matched duration of the media, the matched duration corresponding to a number of signatures in the first one of the candidate media device assets that matches a signature in at least one other candidate media device asset.

6. The apparatus of claim 1, further including an asset quality evaluator to identify the candidate media device assets by:
    obtaining database candidates including a signature, the database candidates including first database candidates having the media identifier;
    storing the first database candidates in a database different from the reference database when the media identified by the media identifier does not have the reference signature in the reference database;
    incrementing a counter when each of the first database candidates are stored in the database; and
    identifying the first database candidates as the candidate media device assets when the counter satisfies a threshold.

7. The apparatus of claim 6, further including a network interface to obtain the database candidates from the media devices via a network.

8. A method comprising:
    generating a hash table using candidate media device assets generated by media devices during respective presentations of media at the media devices, the candidate media device assets including a signature and a media identifier that identifies the media, wherein the media does not have a reference signature in a reference database;

calculating one or more counts of matches of A) a signature and a media identifier of a first one of the candidate media device assets and B) respective signatures and media identifiers of multiple ones of the remaining candidate media device assets using the hash table;

identifying, after the one or more counts of matches are calculated, the signature of the first one of the candidate media device assets as the reference signature based on the one or more counts of matches; and loading the reference signature into the reference database after identifying the signature of the first one of the candidate media device assets as the reference signature.

9. The method of claim 8, further including disqualifying one or more of the candidate media device assets when a jump in a timestamp is identified.

10. The method of claim 8, further including disqualifying one or more candidate media device assets when a corresponding media identifier indicates an incorrect language.

11. The method of claim 8, further including disqualifying one or more candidate media device assets when the one or more candidate media device assets fail to satisfy a minimum duration threshold.

12. The method of claim 8, further including calculating a difference between an expected duration of the media and a matched duration of the media, the matched duration corresponding to a number of signatures in the first one of the candidate media device assets that matches a signature in at least one other candidate media device asset.

13. The method of claim 8, further including:
obtaining database candidates including a signature, the database candidates including first database candidates having the media identifier;
storing the first database candidates in a database different from the reference database when the media identified by the media identifier does not have the reference signature in the reference database;
incrementing a counter when each of the first database candidates are stored in the database; and
identifying the first database candidates as the candidate media device assets when the counter satisfies a threshold.

14. A non-transitory computer readable storage medium comprising instructions which, when executed, cause a machine to at least:
generate a hash table using candidate media device assets generated by media devices during respective presentations of media at the media devices, the candidate media device assets including a signature and a media identifier that identifies the media, wherein the media does not have a reference signature in a reference database;
calculate one or more counts of matches of A) a signature and a media identifier of a first one of the candidate media device assets and B) respective signatures and media identifiers of multiple ones of the remaining candidate media device assets using the hash table;
identify the signature of the first one of the candidate media device assets as the reference signature based on the one or more counts of matches; and
load the reference signature into the reference database after identifying the signature of the first one of the candidate media device assets as the reference signature.

15. The non-transitory computer readable storage medium of claim 14, wherein the instructions, when executed, cause the machine to at least disqualify one or more candidate media device assets when a jump in a timestamp is identified.

16. The non-transitory computer readable storage medium of claim 14, wherein the instructions, when executed, cause the machine to at least disqualify one or more candidate media device assets when a corresponding media identifier indicates an incorrect language.

17. The non-transitory computer readable storage medium of claim 14, wherein the instructions, when executed, cause the machine to at least disqualify one or more candidate media device assets when the one or more candidate media device assets fail to satisfy a minimum duration threshold.

18. The non-transitory computer readable storage medium of claim 14, wherein the instructions, when executed, cause the machine to at least calculate a difference between an expected duration of the media and a matched duration of the media, the matched duration corresponding to a number of signatures in the first one of the candidate media device assets that matches a signature in at least one other candidate media device asset.

19. The non-transitory computer readable storage medium of claim 14, wherein the instructions, when executed, cause the machine to at least:
obtain database candidates including a signature, the database candidates including first database candidates having the media identifier;
store the first database candidates in a database different from the reference database when the media identified by the media identifier does not have the reference signature in the reference database;
increment a counter when each of the first database candidates are stored in the database; and
identify the first database candidates as the candidate media device assets when the counter satisfies a threshold.

20. The non-transitory computer readable storage medium of claim 19, wherein the instructions, when executed, cause the machine to obtain the database candidates from the media devices via a network.

* * * * *